United States Patent
Sagasaki et al.

(10) Patent No.: US 9,395,719 B2
(45) Date of Patent: Jul. 19, 2016

(54) NUMERICAL CONTROL APPARATUS

(75) Inventors: Masakazu Sagasaki, Tokyo (JP); Koji Terada, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 398 days.

(21) Appl. No.: 13/991,350

(22) PCT Filed: Jan. 26, 2011

(86) PCT No.: PCT/JP2011/051522
§ 371 (c)(1),
(2), (4) Date: Jun. 3, 2013

(87) PCT Pub. No.: WO2012/101790
PCT Pub. Date: Aug. 2, 2012

(65) Prior Publication Data
US 2013/0257340 A1    Oct. 3, 2013

(51) Int. Cl.
*G05B 19/18*    (2006.01)
*G05B 19/4099*  (2006.01)
*G05B 19/4067*  (2006.01)

(52) U.S. Cl.
CPC ........ *G05B 19/4099* (2013.01); *G05B 19/4067* (2013.01); *G05B 2219/33131* (2013.01); *G05B 2219/50104* (2013.01)

(58) Field of Classification Search
USPC .................................. 318/569, 570, 574, 575
See application file for complete search history.

(56) References Cited

U.S. PATENT DOCUMENTS

| 3,496,805 | A |   | 2/1970 | Ulrichsen et al. |
| 4,513,380 | A | * | 4/1985 | Spooner ............... G05B 19/186 409/69 |
| 4,604,560 | A |   | 8/1986 | Inagaki et al. |
| 4,635,340 | A | * | 1/1987 | Link ...................... B23B 3/168 29/27 A |

(Continued)

FOREIGN PATENT DOCUMENTS

DE    3328327 A1    8/1983
JP    59-33507 A    2/1984

(Continued)

OTHER PUBLICATIONS

Japanese Office Action of JP 2011-525344 issued Sep. 14, 2011.
(Continued)

*Primary Examiner* — Eduardo Colon Santana
*Assistant Examiner* — Iftekhar Mustafa
(74) *Attorney, Agent, or Firm* — Sughrue Mion, PLLC; Richard C. Turner

(57) ABSTRACT

A numerical control apparatus includes an imaginary-Y-axis control unit configured to execute an imaginary Y-axis control mode which is a mode for converting an X-Y axes movement command in a machining program described in a program coordinate system into a command in a machine coordinate system including X-H-C axes and for driving the X axis, the H axis, and the C axis in association with one another according to the converted command, an acquiring unit configured to acquire, when an emergency stop occurs during the imaginary Y-axis control mode, present positions of the X axis, the C axis, and the H axis at the time when the emergency stop is released, and a restoring unit configured to restore a present X-axis coordinate position and a present Y-axis coordinate position in the program coordinate system from the acquired present positions of the X axis, the C axis, and the H axis.

3 Claims, 12 Drawing Sheets

(56) References Cited

U.S. PATENT DOCUMENTS

| | | | |
|---|---|---|---|
| 4,683,787 | A | 8/1987 | Link |
| 4,992,712 | A | 2/1991 | Fujimoto et al. |
| RE33,732 | E | 11/1991 | Link |
| 6,324,949 | B1 | 12/2001 | Link et al. |

FOREIGN PATENT DOCUMENTS

| | | | |
|---|---|---|---|
| JP | 61-214947 | A | 9/1986 |
| JP | 1-109052 | A | 4/1989 |
| JP | 2-151909 | A | 6/1990 |
| JP | 2-151909 | A | 11/1990 |
| JP | 3-33441 | B2 | 5/1991 |
| JP | 3-254380 | A | 11/1991 |
| JP | 6-99306 | A | 4/1994 |
| JP | 6-332524 | A | 12/1994 |
| JP | 2000-218422 | A | 8/2000 |
| JP | 2004-306073 | A | 11/2004 |
| JP | 2007-185748 | A | 7/2007 |
| JP | 2007185748 | A * | 7/2007 |

OTHER PUBLICATIONS

German Office Action, mailed Mar. 17, 2014, Application No. 11 2011 104779.7.

* cited by examiner

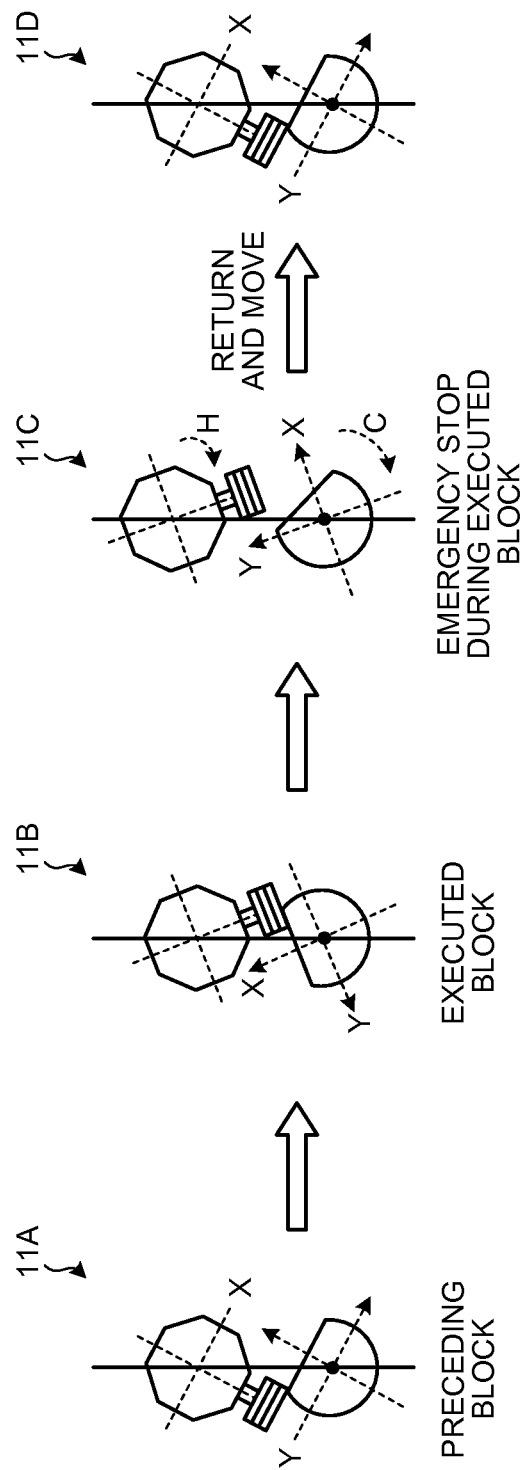

| | |
|---|---|
| N100 T1010 | ⋯⋯ REPLACE TOOL WITH MILLING CUTTER |
| N101 G90 | |
| N102 G00 C0 | ⋯⋯ SELECT C-AXIS MODE |
| N103 G00 X60 H0 Z0 | ⋯⋯ POSITION TOOL DIRECTION AND IMAGINARY PLANE X-AXIS DIRECTION IN PARALLEL |
| N104 M111 | ⋯⋯ IMAGINARY Y-AXIS CONTROL MODE COMMAND (YD11=1) |
| N105 G94 G17 | ⋯⋯ CANCEL SYNCHRONIZATION FEED MODE, SELECT PLANE OF END FACE MACHINING |
| N106 G00 X20 Y50 | ⋯⋯ MOVE TO MACHINING START POSITION |
| N107 G01 X20 Y-50 F1000 | ⋯⋯ MILLING |
| N108 G00 X30 | ⋯⋯ RETRACT X AXIS |
| N109 G00 C180 | ⋯⋯ REVERSE WORK |
| N110 G00 X20 -Y50 | ⋯⋯ MOVE TO MACHINING START POSITION |
| N111 G01 X20 Y50 | ⋯⋯ MILLING |
| N112 G00 X30 | ⋯⋯ RETRACT X AXIS |
| N113 G00 Y0 | ⋯⋯ POSITION TOOL DIRECTION AND IMAGINARY PLANE X-AXIS DIRECTION IN PARALLEL |
| N114 T1111 | ⋯⋯ TURN TURRET ROTATION AXIS AND REPLACE TOOL WITH DRILLING TOOL |
| N115 G00 X20 Y10 | ⋯⋯ MOVE TO MACHINING START POSITION |
| N116 G83 X5 D40 H3 F100 | ⋯⋯ DRILLING FIXED CYCLE |
| N117 G00 X30 Y0 | ⋯⋯ POSITION TOOL DIRECTION AND IMAGINARY PLANE X-AXIS DIRECTION IN PARALLEL |
| N118 M101 | ⋯⋯ CANCEL IMAGINARY Y-AXIS CONTROL MODE (YD11=0) |
| N119 G53 X100 H0 C0 | |

⋮

NUMERICAL CONTROL APPARATUS

CROSS REFERENCE TO RELATED APPLICATIONS

This application is a National Stage of International Application No. PCT/JP2011/051522, filed on Jan. 26, 2011, the contents of all of which are incorporated herein by reference in their entirety.

FIELD

The present invention relates to a numerical control apparatus.

BACKGROUND

Patent Literature 1 describes an NC turret lathe not including a Y axis. The NC turret lathe includes a Z axis for performing feeding action of a work, a C axis for performing rotation of the work, an X axis perpendicular to the Z axis and for performing feeding action for a tool turret, and a turret rotation axis for performing rotation of the tool turret. However, the NC turret lathe does not include the Y axis perpendicular to the Z axis and the X axis. In such an NC turret lathe, the rotation of the C axis and the rotation of the turret rotation axis are performed in combination to generate feeding action for the tool in the Y axis direction with respect to the work. Consequently, according to Patent Literature 1, it is possible to execute machining action using the NC turret lathe not including the Y axis as if the NC turret had the Y axis.

CITATION LIST

Patent Literature

Patent Literature 1: Japanese Patent Publication No. H3-33441

SUMMARY

Technical Problem

In control for performing machining as if a machine tool had a Y axis, i.e., imaginary Y-axis control, if the machine tool is emergency-stopped while processing a work using a tool, the imaginary Y-axis control is cancelled. Thereafter, even if the emergency stop of the machine tool is released, if the tool is inserted into the work, because the imaginary Y-axis control is cancelled, it is difficult to rotate, while moving the tool in an X-axis direction, a turret and the work in synchronization with the movement of the tool. That is, it is difficult to pull out the tool from the work to return the machine tool to a state before the emergency stop. It is likely that the tool is broken if it is attempted to pull out the tool from the work by force.

Even when the tool is not inserted into the work, if the machine tool is emergency-stopped, the imaginary Y-axis control is cancelled and driving of the turret and the work shifts to a servo-off state. Therefore, the turret and the work move with own weights thereof. Consequently, it is difficult to grasp coordinates of the turret and the work immediately before the emergency stop of the machine tool. That is, it is difficult to return the turret in the machine tool and the work to positions immediately before the emergency stop to return the machine tool to a state immediately before the emergency stop. Further, it is also difficult to resume, after the emergency stop of the machine tool is released, machining executed by the machine tool when the machine tool is emergency-stopped.

The present invention has been devised in view of the above and it is an object of the present invention to obtain a numerical control apparatus that can return a machine tool to a state before an emergency stop.

Solution to Problem

There is provided a numerical control apparatus that controls a machine tool including an X axis for moving a turret to which a plurality of tools are attached, a H axis for rotating the turret, and a C axis for rotating a work and not including a Y axis orthogonal to the X axis, the numerical control apparatus comprising: an imaginary-Y-axis control unit configured to execute an imaginary Y-axis control mode, the imaginary Y-axis control mode being a mode for converting an X-Y axes movement command in a machining program described in a program coordinate system into a command in a machine coordinate system including X-H-C axes and for driving the X axis, the H axis, and the C axis in association with one another according to the converted command; an acquiring unit configured to acquire, when an emergency stop occurs during the imaginary Y-axis control mode, present positions of the X axis, the C axis, and the H axis at time when the emergency stop is released; and a restoring unit configured to restore a present X-axis coordinate position and a present Y-axis coordinate position in the program coordinate system from the acquired present positions of the X axis, the C axis, and the H axis.

Advantageous Effects of Invention

According to the present invention, because the present coordinate positions of the X axis and the Y axis in the program coordinate system are restored, it is possible to instruct the numerical control apparatus to return the machine tool to the state before the emergency stop on the program coordinate system. Therefore, it is possible to return the machine tool to the state before the emergency stop.

BRIEF DESCRIPTION OF DRAWINGS

FIG. 11 is a diagram for explaining operation during the emergency stop of a machine tool in the second embodiment.

FIG. 12 is a diagram for a machining program in the second embodiment.

DESCRIPTION OF EMBODIMENTS

Embodiments of a numerical control apparatus according to the present invention are explained in detail below based on the drawings. The invention is not limited by the embodiments.

First Embodiment.

A schematic configuration of a numerical control apparatus 1 according to a first embodiment is explained with reference to FIGS. 1 and 2. FIGS. 1A and 1B are respectively a perspective view and a front view of an external configuration of a machine tool 900 controlled by the numerical control apparatus 1. FIG. 2 is a block diagram of the configuration of the numerical control apparatus 1.

Figure 1A:
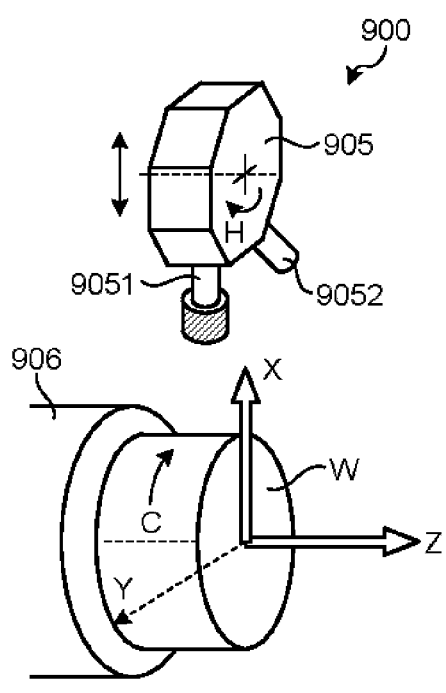
FIG. 1 is a diagram of an external configuration of a machine tool in a first embodiment.
Figure 1B:
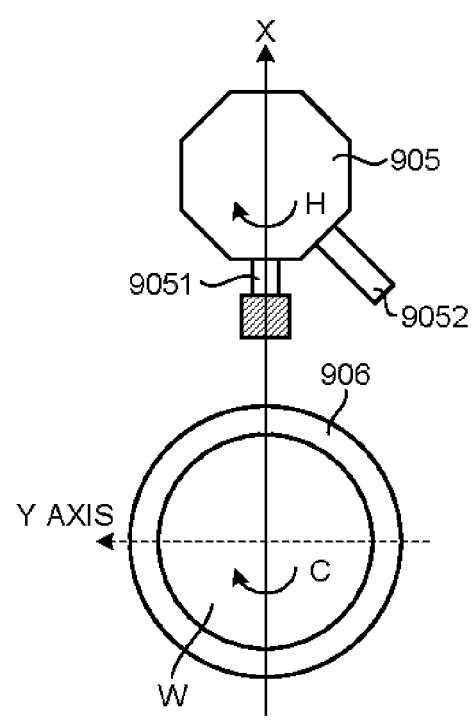
Figure 2:
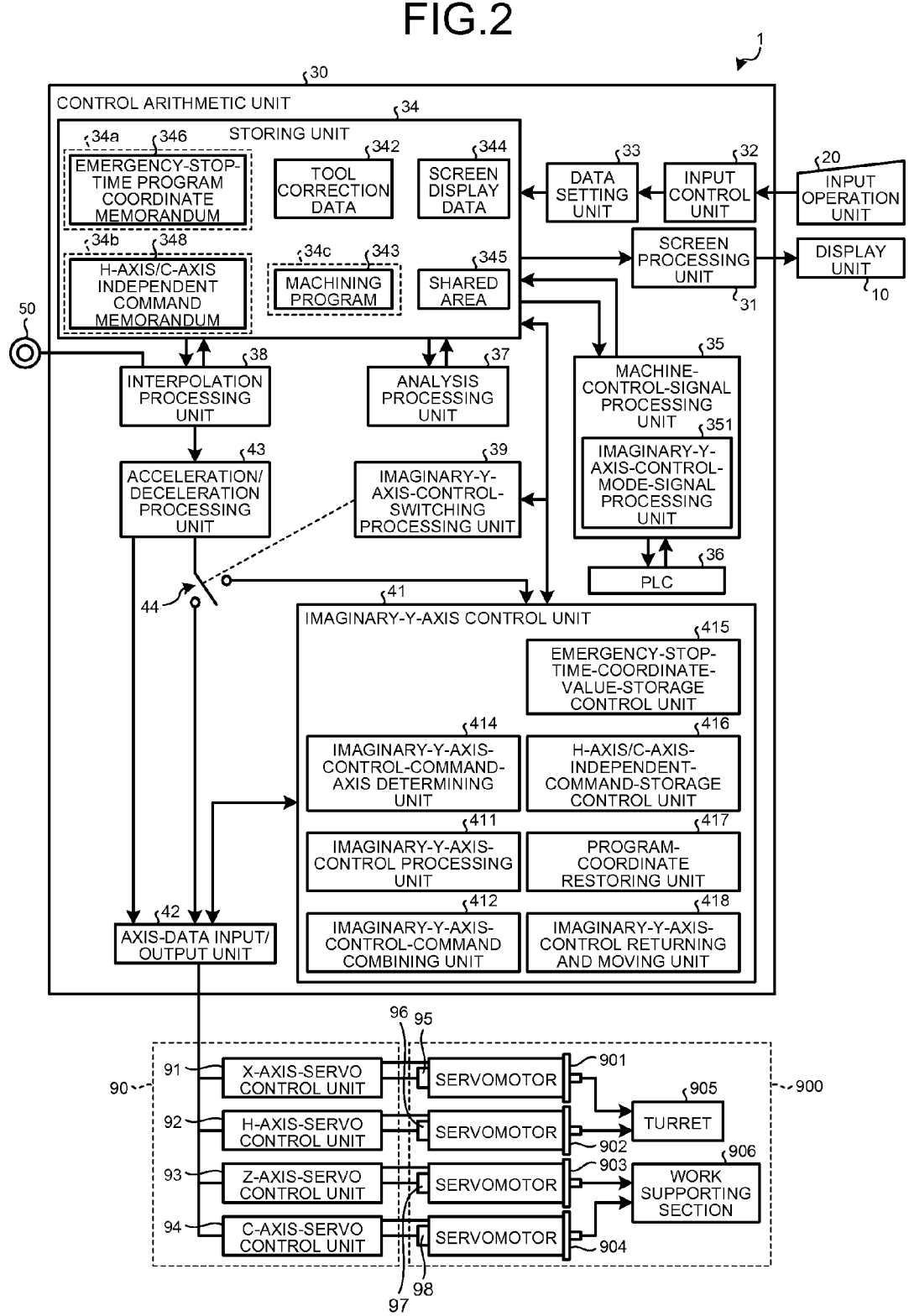
FIG. 2 is a diagram of the configuration of a numerical control apparatus according to the first embodiment.

As shown in FIGS. 1A and 1B, the machine tool 900 includes a turret 905 and a work supporting section 906. The machine tool 900 includes an X axis, a Z axis, an H axis, and a C axis. The X axis is a movement axis for moving the turret 905. The Z axis is a movement axis for moving a work W. The H axis is a rotation axis for rotating the turret 905 to turn tools 9051 and 9052. The C axis is a rotation axis for rotating the work W.

In FIGS. 1A and 1B, a Y axis perpendicular to the X axis and the Z axis is indicated by a broken line. The Y axis is an imaginary movement axis used in an imaginary Y-axis control mode in a machining program 343 created by a user. In the imaginary Y-axis control mode, the user designates coordinate positions of the X axis, the Y axis, the H axis, and the C axis and creates a required machining program 343. In this embodiment, the Z axis is not designated during the imaginary Y-axis control mode. The user creates, without taking into account rotation of the H axis and the C axis, the machining program 343 by designating, for example, X-Y coordinates assuming a state in which a tool direction and an imaginary plane X axis coincide with each other. In the machining program 343, for example, an X-axis command is described as "X20", a Y-axis command is described as "Y50", a C-axis command is described as "C180", and an H-axis command is described as "T1111" (see FIG. 12).

As shown in FIG. 2, the machine tool 900 further includes X-axis, H-axis, Z-axis, and C-axis servomotors 901, 902, 903, and 904. The X-axis servomotor 901 and the H-axis servomotor 902 apply movement of the X axis and rotation of the H axis to the turret 905. The Z-axis servomotor 903 and the C-axis servomotor 904 apply movement of the Z axis and rotation of the C axis to the work supporting section 906.

The numerical control apparatus 1 includes a display unit 10, an input operation unit 20, a control arithmetic unit 30, and a driving unit 90. For example, according to operation of an automatic startup button of the machining program 343 by the user, a signal of automatic startup of the machining program 343 is supplied to the control arithmetic unit 30. According to the signal, the control arithmetic unit 30 starts up the machining program 343 and, according to the machining program 343, generates a movement amount command for the X axis, a rotation amount command for the H axis, a movement amount command for the Z axis, and a rotation amount command for the C axis and supplies the commands to the driving unit 90. The driving unit 90 includes an X-axis-servo control unit 91, an H-axis-servo control unit 92, a Z-axis-servo control unit 93, and a C-axis-servo control unit 94. The driving unit 90 drives the X-axis servomotor 901, the H-axis servomotor 902, the Z-axis servomotor 903, and the C-axis servomotor 904 according to the movement amount command for the X axis the rotation amount command for the H axis, the movement amount command for the Z axis, and the rotation amount command for the C axis input from the control arithmetic unit 30. The control arithmetic unit 30 receives feedback position data (FB position data: coordinate positions of the X axis, the H axis, the Z axis, and the C axis in a machine coordinate system established from data of the position sensors) from an X-axis position sensor 95, an H-axis position sensor 96, a Z-axis position sensor 97, and a C-axis position sensor 98 through the driving unit 90.

The control arithmetic unit 30 includes a PLC 36, a machine-control-signal processing unit 35, a storing unit 34, an analysis processing unit 37, an interpolation processing unit 38, an imaginary-Y-axis-control-switching processing unit 39, a switch 44, an acceleration/deceleration processing unit 43, an imaginary-Y-axis control unit 41, an axis-data input/output unit 42, an input control unit 32, a screen processing unit 31, and a data setting unit 33.

The signal of the automatic startup of the machining program 343 is input to the machine-control-signal processing unit 35 through the PLC 36. The machine-control-signal processing unit 35 instructs, through the storing unit 34, the analysis processing unit 37 to start up the machining program 343.

The storing unit 34 includes storing units 34a to 34c. The storing unit 34a, the storing unit 34b, and the storing unit 34c respectively store an emergency-stop-time program coordinate memorandum 346, an H-axis/C-axis independent command memorandum 348, and the machining program 343. Respective details of the emergency-stop-time program coordinate memorandum 346 and the H-axis/C-axis independent command memorandum 348 are explained below. The storing unit 34 stores tool correction data 342, the machining program 343, and screen display data 344 and includes a shared area 345 as a work space.

The analysis processing unit 37 reads out, according to a startup instruction of the machining program 343, the machining program 343 from the storing unit 34 and performs analysis processing concerning respective blocks (respective rows) of the machining program 343. If an M code (e.g., an M code "M111" shown in FIG. 12) is included in an analyzed block (row), the analysis processing unit 37 passes a result of the analysis to the PLC 36 through the storing unit 34 and the machine-control-signal processing unit 35. If a code (e.g., a G code "G01" shown in FIG. 12) other than the M code is included in the analyzed row, the analysis processing unit 37 adds tool correction amounts (Tx, Ty) read out from the tool correction data 342 of the storing unit 34 to a result of the analysis and passes the analysis result to the interpolation processing unit 38.

When receiving the analysis result (e.g., the M code "M111" shown in FIG. 12), the PLC 36 receives a notification of an M code for imaginary Y-axis control mode ON and turns on an imaginary Y-axis control mode signal. An imaginary-Y-axis-control-mode-signal processing unit 351 in the machine-control-signal processing unit 35 checks an imaginary Y-axis control mode signal and causes the shared area 345 of the storing unit 34 to temporarily store the imaginary Y-axis control mode signal. Consequently, in the numerical control apparatus 1, the imaginary Y-axis control mode is started and the units refer to the imaginary Y-axis control mode signal (ON state) of the shared area 345 to thereby recognize that the numerical control apparatus 1 is in the imaginary Y-axis control mode. When the PLC 36 receives an M code analysis result of imaginary Y-axis control mode OFF (e.g., an M code "M101" shown in FIG. 12), the imaginary-Y-axis-control-mode-signal processing unit 351 in the machine-control-signal processing unit 35 changes the imaginary Y-axis control mode signal to an OFF state and causes the shared area 345 to temporarily store the imaginary Y-axis control mode signal. Consequently, in the numerical control apparatus 1, the imaginary Y-axis control mode is cancelled. The numerical control apparatus 1 changes to a normal control mode other than the imaginary Y-axis control mode.

The interpolation processing unit 38 receives an analysis result (a position command) from the analysis processing unit 37, performs interpolation processing for the analysis result (the position command), and supplies a result of the interpolation processing (a movement amount and a rotation amount) to the acceleration/deceleration processing unit 43.

The acceleration/deceleration processing unit 43 applies acceleration/deceleration processing to a result of the interpolation processing supplied from the interpolation processing unit 38. The acceleration/deceleration processing unit 43 outputs acceleration/deceleration processing results concerning the X axis, the Y axis, the C axis, and the H axis to the switch 44 and directly outputs an acceleration/deceleration processing result concerning the Z axis to the axis-data-input/output unit 42.

The switch 44 outputs, based on a switching signal from the imaginary-Y-axis-control-switching processing unit 39, the acceleration/deceleration processing results to the imaginary-Y-axis control unit 41 or the axis-data input/output unit 42. The imaginary-Y-axis-control-switching processing unit 39 switches the switch 44 to connect the acceleration/deceleration processing unit 43 and the imaginary-Y-axis control unit 41 in the imaginary Y-axis control mode in which the imaginary Y-axis control mode signal of the shared area 345 is ON. The imaginary-Y-axis-control-switching processing unit 39 switches the switch 44 to connect the acceleration/deceleration processing unit 43 and the axis-data input/output unit 42 in a control mode other than the imaginary Y-axis control mode in which the imaginary Y-axis control mode signal of the shared area 345 is OFF.

The imaginary-Y-axis control unit 41 executes control processing in the imaginary Y-axis control mode. Specifically, the imaginary-Y-axis control unit 41 converts the X-axis, Y-axis, C-axis, and H-axis commands subjected to the acceleration/deceleration processing into X-axis, C-axis, and H-axis commands and inputs the converted X-axis, C-axis, and H-axis commands to the axis-data input/output unit 42. In the imaginary Y-axis control mode, usually, the X axis, the H axis, and the C axis act in association with one another.

The imaginary-Y-axis control unit 41 includes an imaginary-Y-axis-control-command-axis determining unit 414, an imaginary-Y-axis-control processing unit 411, an imaginary-Y-axis-control-command combining unit 412, an emergency-stop-time-coordinate-value-storage control unit 415, an H-axis/C-axis-independent-command-storage control unit 416, a program-coordinate restoring unit 417, and an imaginary-Y-axis-control returning and moving unit 418.

The imaginary-Y-axis-control-command-axis determining unit 414 determines, under the imaginary Y-axis control mode, referring to, for each one block (one row), a machining program stored in the storing unit 34c, whether commands of respective blocks (respective rows) are a movement amount command for the X-Y axes or an independent rotation amount command for the H axis or the C axis. When a command by the machining program 343 is the movement amount command for the X-Y axes (e.g., a movement amount command by "G00 X20 Y50" shown in FIG. 12), the imaginary-Y-axis-control-command-axis determining unit 414 supplies the movement amount command for the X-Y axes, which is input from the acceleration/deceleration processing unit 43, to the imaginary-Y-axis-control processing unit 411. When the command by the machining program 343 is the independent rotation amount command for the H axis or the C axis (e.g., an independent rotation amount command by "T1111" or "C180" shown in FIG. 12), the imaginary-Y-axis-control-command-axis determining unit 414 supplies the independent rotation amount command for the H axis or the C axis, which is input from the acceleration/deceleration processing unit 43, to the imaginary-Y-axis-control-command combining unit 412. In other words, the imaginary-Y-axis-control-command-axis determining unit 414 separates, for each one block, a command of a machining program created in a program coordinate system into a first movement amount command including a movement amount command for the X-Y axes and a second movement amount command including any one of an H-axis independent movement amount command and a C-axis independent movement amount command or both, supplies the first movement amount command to the imaginary-Y-axis-control processing unit 411, and supplies the second movement amount command to the imaginary-Y-axis-control-command combining unit 412.

In the imaginary Y-axis control mode, the imaginary-Y-axis-control processing unit 411 converts the movement amount command for the X-Y axes input from the acceleration/deceleration processing unit 43 into a moving position command (X1, Y1), coordinate-converts the converted moving position command into a moving position command for the X axis, a rotating position command for the H axis, and a rotating position command for the C axis, which are moving position commands of a machine coordinate system serving as an actual coordinate system, and calculates moving target positions (Xr1, Hr1, Cr1) of the X axis, the H axis, and the C axis.

Specifically, the imaginary-Y-axis-control processing unit 411 calculates X-Y moving positions of this time using X-Y moving positions calculated last time and the movement amount command for the X-Y axes input from the acceleration/deceleration processing unit 43. The imaginary-Y-axis-control processing unit 411 coordinate-converts the calculated X-Y moving positions of this time (X1, Y1) according to the following Formulas 1 to 3 and calculates moving positions (Xr1, Hr1, Cr1) in the machine coordinate system.

$$Xr1 = f_1(X1) + f_2(Y1) \qquad \text{Formula 1}$$

$$Hr1 = f_{11}(X1) + f_{12}(Y1) \qquad \text{Formula 2}$$

$$Cr1 = f_{21}(X1) + f_{22}(Y1) \qquad \text{Formula 3}$$

Further, the imaginary-Y-axis-control processing unit 411 calculates a difference between last-time moving positions (Xr0, Hr0, Cr0) and the moving positions of this time (Xr1, Hr1, Cr1) in the machine coordinate system to thereby calculate an X-axis movement amount ($\Delta Xr1=Xr1-Xr0$), an H-axis rotation amount ($\Delta Hr1=Hr1-Hr0$), and a C-axis rotation amount ($\Delta Cr1=Cr1-Cr0$) in the machine coordinate system.

The imaginary-Y-axis-control processing unit 411 repeats such processing for each interpolation points. The imaginary-Y-axis-control processing unit 411 supplies a movement amount command ($\Delta Xr1$) for the X axis to the axis-data input/output unit 42 and supplies a rotation amount command ($\Delta Hr1$) for the H axis and a rotation amount command ($\Delta Cr1$) for the C axis to the imaginary-Y-axis-control-command combining unit 412.

When the imaginary-Y-axis-control processing unit 411 does not receive the movement amount command for the X-Y axes, the imaginary-Y-axis-control processing unit 411 supplies rotation amount commands of rotation amount zero, i.e., $\Delta Hr1=0$ and $\Delta Cr1=0$ to the imaginary-Y-axis-control-command combining unit 412 and supplies $\Delta Xr1=0$ to the axis-data input/output unit 42.

The imaginary-Y-axis-control-command combining unit 412 combines the independent rotation amount commands (any one of $\Delta H2$ and $\Delta C2$ or both) for any one of the H axis and the C axis or both input from the acceleration/deceleration processing unit 43 and the rotation amount command ($\Delta Hr1$) for the H axis and the rotation amount command ($\Delta Cr1$) for the C axis after the coordinate conversion input from the imaginary-Y-axis-control processing unit 411, respectively.

As indicated by the following Formula 4, the imaginary-Y-axis-control-command combining unit 412 combines the independent rotation amount command $\Delta Hr2$ ($=\Delta H2$) for the H axis with the rotation amount command for the H axis $\Delta Hr1$ generated by the imaginary-Y-axis-control processing unit 411 to generate a rotation amount command $\Delta Hr$ for the H axis.

$$\Delta Hr=\Delta Hr1+\Delta Hr2 \qquad \text{Formula 4}$$

Similarly, as indicated by the following Formula 5, the imaginary-Y-axis-control-command combining unit 412 combines the independent rotation amount command $\Delta Cr2$ ($=\Delta C2$) for the C axis with the rotation amount command $\Delta Cr1$ for the C axis generated by the imaginary-Y-axis-control processing unit 411 to generate a rotation amount command $\Delta Cr$ for the C axis.

$$\Delta Cr=\Delta Cr1+\Delta Cr2 \qquad \text{Formula 5}$$

The imaginary-Y-axis-control-command combining unit 412 supplies the generated rotation amount command $\Delta Hr$ for the H axis and the generated rotation amount command $\Delta Cr$ for the C axis to the axis-data input/output unit 42.

The emergency-stop-time-coordinate-value-storage control unit 415 controls storage of the emergency-stop-time program coordinate memorandum 346 in the storing unit 34a. For example, the emergency-stop-time-coordinate-value-storage control unit 415 regularly acquires coordinates (X2, Y2) of the X axis and the Y axis in the program coordinate system from the imaginary-Y-axis-control processing unit 411 and, for example, regularly overwrites and stores the acquired coordinates (X2, Y2) of the X axis and the Y axis in the storing unit 34a as the emergency-stop-time program coordinate memorandum 346.

The H-axis/C-axis-independent-command-storage control unit 416 controls storage of the H-axis/C-axis independent command memorandum 348 in the storing unit 34b. For example, every time an independent rotation amount command for the H axis or the C axis is input, the H-axis/C-axis-independent-command-storage control unit 416 acquires a rotation amount by the independent rotation amount command for the H axis or the C axis from the imaginary-Y-axis-control-command combining unit 412, integrates the acquired rotation amount by the independent rotation amount command for the H axis or the C axis, and, for example, overwrites and stores present H-axis rotating position and C-axis rotating position ($\Delta H3$, $\Delta C3$) by the independent rotation amount command for the H axis or the C axis, which are integration results, in the storing unit 34b as the H-axis/C-axis independent command memorandum 348. In other words, the H-axis/C-axis-independent-command-storage control unit 416 stores an integrated value of the movement amount by the second movement amount command before the emergency stop in the storing unit 34b as a value indicating the present H-axis rotating position and the present C-axis rotating position.

When the emergency stop is released, the program-coordinate restoring unit 417 restores the coordinates of the X axis and the Y axis in the program coordinate system. Specifically, when receiving a command for emergency stop release, the program-coordinate restoring unit 417 acquires the present coordinates (Xr0, Hr0, Cr0) of the X axis, the H axis, and the C axis in the machine coordinate system from position sensors 95, 96, and 98 of the servomotors 901, 902, and 904 through the axis-data input/output unit 42. The program-coordinate restoring unit 417 restores, according to the following Formulas 6 and 7, the present coordinates (X0, Y0) of the X axis and the Y axis in the program coordinate system from the present coordinates (Xr0, Hr0, Cr0) of the X axis, the Y axis, and the C axis in the machine coordinate system.

$$X0=f'_{11}(Xr0)+f'_{12}(Hr0)+f'_{13}(Cr0) \qquad \text{Formula 6}$$

$$Y0=f'_{21}(Xr0)+f'_{22}(Hr0)+f'_{23}(Cr0) \qquad \text{Formula 7}$$

That is, the program-coordinate restoring unit 417 performs conversion in a direction opposite to the direction of the conversion performed by the imaginary-Y-axis-control processing unit 411 (conversion from the program coordinate into the machine coordinate).

When the emergency stop is released, the imaginary-Y-axis-control returning and moving unit 418 returns and moves the work W and the turret 905 to positions immediately before the emergency stop. Specifically, when receiving a command for emergency stop release, the imaginary-Y-axis-control returning and moving unit 418 reads out the emergency-stop-time program coordinate memorandum 346 from the storing unit 34a and acquires coordinates (X4, Y4) of the X axis and the Y axis immediately before the emergency stop in the program coordinate system. The imaginary-Y-axis-control returning and moving unit 418 performs interpolation processing and acceleration/deceleration processing in response to a movement amount command for movement from the restored present coordinates (X0, Y0) in the program coordinate system to the coordinates (X4, Y4) of the X axis and the Y axis immediately before the emergency stop.

Specifically, the imaginary-Y-axis-control returning and moving unit 418 calculates X-Y moving positions of this time using a movement amount command for X-Y axes as a result of the interpolation processing and the acceleration/deceleration processing and the restored present coordinates (X0, Y0). The imaginary-Y-axis-control returning and moving unit 418 coordinate-converts the calculated X-Y moving positions (X4, Y4) of this time in the program coordinate system according to Formulas 1 to 3 and calculate moving positions (Xr4, Hr4, Cr4) in the machine coordinate system.

Further, the imaginary-Y-axis-control returning and moving unit 418 calculates a difference between the present positions (Xr0, Hr0, Cr0) acquired from the position sensors 95, 96, and 98 in the machine coordinate system and moving positions (Xr4, Hr4, Cr4) of this time to thereby calculate an X-axis movement amount ($\Delta Xr4 = Xr4 - Xr0$), an H-axis rotation amount ($\Delta Hr4 = Hr4 - Hr0$), and a C-axis rotation amount ($\Delta Cr4 = Cr4 - Cr0$) in the machine coordinate system.

The imaginary-Y-axis-control returning and moving unit 418 repeats such processing for each interpolation point. The imaginary-Y-axis-control returning and moving unit 418 supplies a movement amount command ($\Delta Xr4$) for the X axis, a rotation amount command ($\Delta Hr4$) for the H axis, and a rotation amount command ($\Delta Cr4$) for the C axis to the axis-data input/output unit 42.

The axis-data input/output unit 42 supplies the movement amount commands $\Delta Xr1$ and $\Delta Xr4$ for the X axis to the driving unit 90 and supplies the rotation amount commands $\Delta Hr$ and $\Delta Hr4$ for the H axis and the rotation amount commands $\Delta Cr$ and $\Delta Cr4$ for the C axis to the driving unit 90.

A handle 50 generates, for example, a movement amount command for the X axis according to manual operation by the user. When an emergency stop occurs in a state in which a tool is inserted into the work W, the handle 50 is used, for example, when the tool is pulled out from the work W after the emergency stop is released. The handle 50 can be used in a handle mode.

Figure 3:
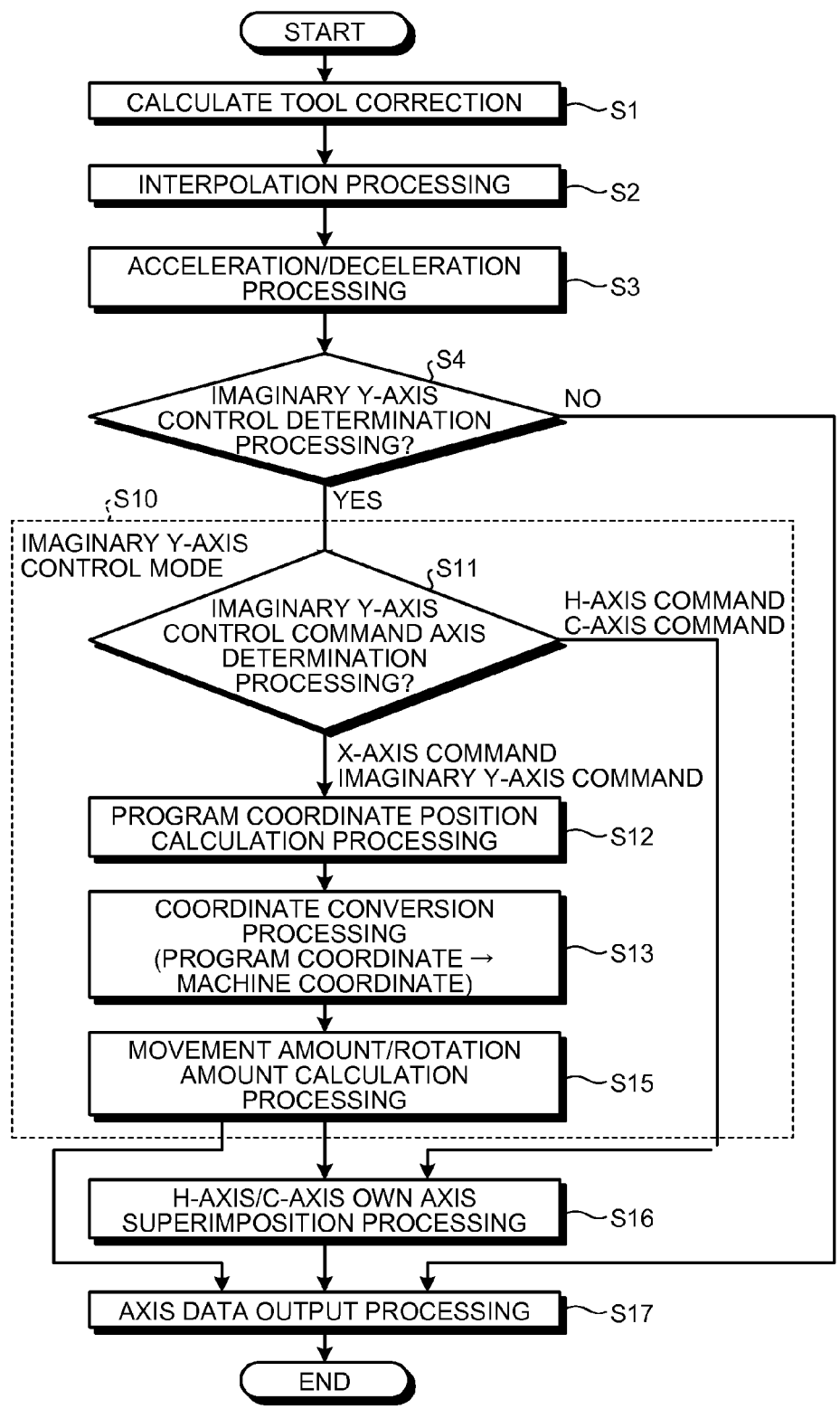
FIG. 3 is a flowchart for explaining operation at normal time of the numerical control apparatus according to the first embodiment.

Operation at normal time of the numerical control apparatus 1 according to the first embodiment is explained with reference to FIG. 3. FIG. 3 is a flowchart for explaining the operation of the numerical control apparatus according to the first embodiment.

At step S1, the analysis processing unit 37 reads out tool correction amounts (Tx, Ty) from the storing unit 34, adds the tool correction amounts (Tx, Ty) to an analysis result of the machining program 343, and passes the analysis result to the interpolation processing unit 38.

At step S2, the interpolation processing unit 38 receives the analysis result (a position command) from the analysis processing unit 37, performs interpolation processing for the analysis result (the position command), and supplies a result of the interpolation processing to the acceleration/deceleration processing unit 43.

At step S3, the acceleration/deceleration processing unit 43 applies acceleration/deceleration processing to the supplied result of the interpolation processing and supplies an acceleration/deceleration processing result to the switch 44.

At step S4, the imaginary-Y-axis-control-switching processing unit 39 determines, based on the imaginary Y-axis control mode signal of the shared area 345, whether imaginary Y-axis control determination processing should be performed. That is, when the numerical control apparatus 1 is in the imaginary Y-axis control mode ("Yes" at step S4), the imaginary-Y-axis-control-switching processing unit 39 advances the processing to step S10. When the numerical control apparatus 1 is in a control mode other than the imaginary Y-axis control mode ("No" at step S4), the imaginary-Y-axis-control-switching processing unit 39 advances the processing to step S17.

At step S10, the imaginary-Y-axis control unit 41 performs processing in the imaginary Y-axis control mode. Specifically, the imaginary-Y-axis control unit 41 performs processing at steps S11 to S16 explained below.

At step S11, the imaginary-Y-axis-control-command-axis determining unit 414 determines, referring to the machining program 343 stored in the storing unit 34 for each one block, whether commands of respective blocks are a movement amount command for the X-Y axes or an independent rotation amount command for any one of the H axis and the C axis or both. When a command by the machining program 343 is a movement amount command for the X-Y axes (e.g., a movement amount command to "X20 Y50" shown in FIG. 12), the imaginary-Y-axis-control-command-axis determining unit 414 supplies the movement amount command for the X-Y axes to the imaginary-Y-axis-control processing unit 411 and advances the processing to step S12. When the command by the machining program 343 is the independent rotation amount command for any one of the H axis and the C axis or both (e.g., an independent rotation amount command by "T1111" or "C180" shown in FIG. 12), the imaginary-Y-axis-control-command-axis determining unit 414 supplies the independent rotation amount command for any one of the H axis and the C axis or both to the imaginary-Y-axis-command combining unit 412 and advances the processing to step S16.

At step S12, the imaginary-Y-axis-control processing unit 411 performs program coordinate position calculation processing. That is, the imaginary-Y-axis-control processing unit 411 calculates moving positions of this time (an X-axis coordinate "X1" and a Y-axis coordinate "Y1") using the movement amount command for the X-Y axes input from the acceleration/deceleration processing unit 43 and X-Y moving positions of the last time.

At step S13, the imaginary-Y-axis-control processing unit 411 performs coordinate conversion processing (conversion processing for a program coordinate to a machine coordinate of the imaginary Y-axis control). That is, the imaginary-Y-axis-control processing unit 411 coordinate-converts the moving positions of this time (X1, Y1) in the program coordinate system according to Formulas 1 to 3 above and calculates moving positions (Xr1, Hr1, Cr1) in the machine control system.

At step S15, the imaginary-Y-axis-control processing unit 411 calculates a difference between the last positions (Xr0, Hr0, Cr0) in the machine coordinate system and the moving positions of this time (Xr1, Hr1, Cr1) to thereby calculate the X-axis movement amount ($\Delta Xr1 = Xr1 - Xr0$), the H-axis rotation amount ($\Delta Hr1 = Hr1 - Hr0$), and the C-axis rotation amount ($\Delta Cr1 = Cr1 - Cr0$) in the machine coordinate system. The imaginary-Y-axis-control processing unit 411 supplies a movement amount command ($\Delta Xr1$) for the X axis to the axis-data input/output unit 42 and advances the processing to step S17. The imaginary-Y-axis-control processing unit 411 supplies a rotation amount command ($\Delta Hr1$) of the H axis and a rotation amount command ($\Delta Cr1$) for the C axis to the imaginary-Y-axis-control-command combining unit 412 and advances the processing to step S16.

At step S16, as indicated by Formula 4 above, the imaginary-Y-axis-control-command combining unit 412 combines the independent rotation amount command $\Delta Hr2$ for the H axis with the rotation amount command $\Delta Hr1$ of the H axis generated by the imaginary-Y-axis-control processing unit 411 and generates the rotation amount command $\Delta Hr$ for the H axis. Similarly, as indicated by Formula 5 above, the imaginary-Y-axis-control-command combining unit 412 combines the independent rotation amount command $\Delta Cr2$ for the C axis with the rotation amount command $\Delta Cr1$ for the C axis generated by the imaginary-Y-axis-control processing unit 411 and generates the rotation amount command $\Delta Cr$ for the C axis. The imaginary-Y-axis-control-command combining unit 412 supplies the generated rotation amount command $\Delta Hr$ for the H axis and the generated rotation amount command $\Delta Cr$ for the C axis to the axis-data input/output unit 42.

At step S17, the axis-data input/output unit 42 performs axis data output processing. That is, the axis-data input/output unit 42 supplies the movement amount command ΔXr1 for the X axis, which is supplied from the imaginary-Y-axis-control processing 411, to the driving unit 90. The axis-data input/output unit 42 supplies the rotation amount command ΔHr for the H axis and the rotation amount command ΔCr for the C axis, which are supplied from the imaginary-Y-axis-control-command combining unit 412, to the driving unit 90.

Figure 4:
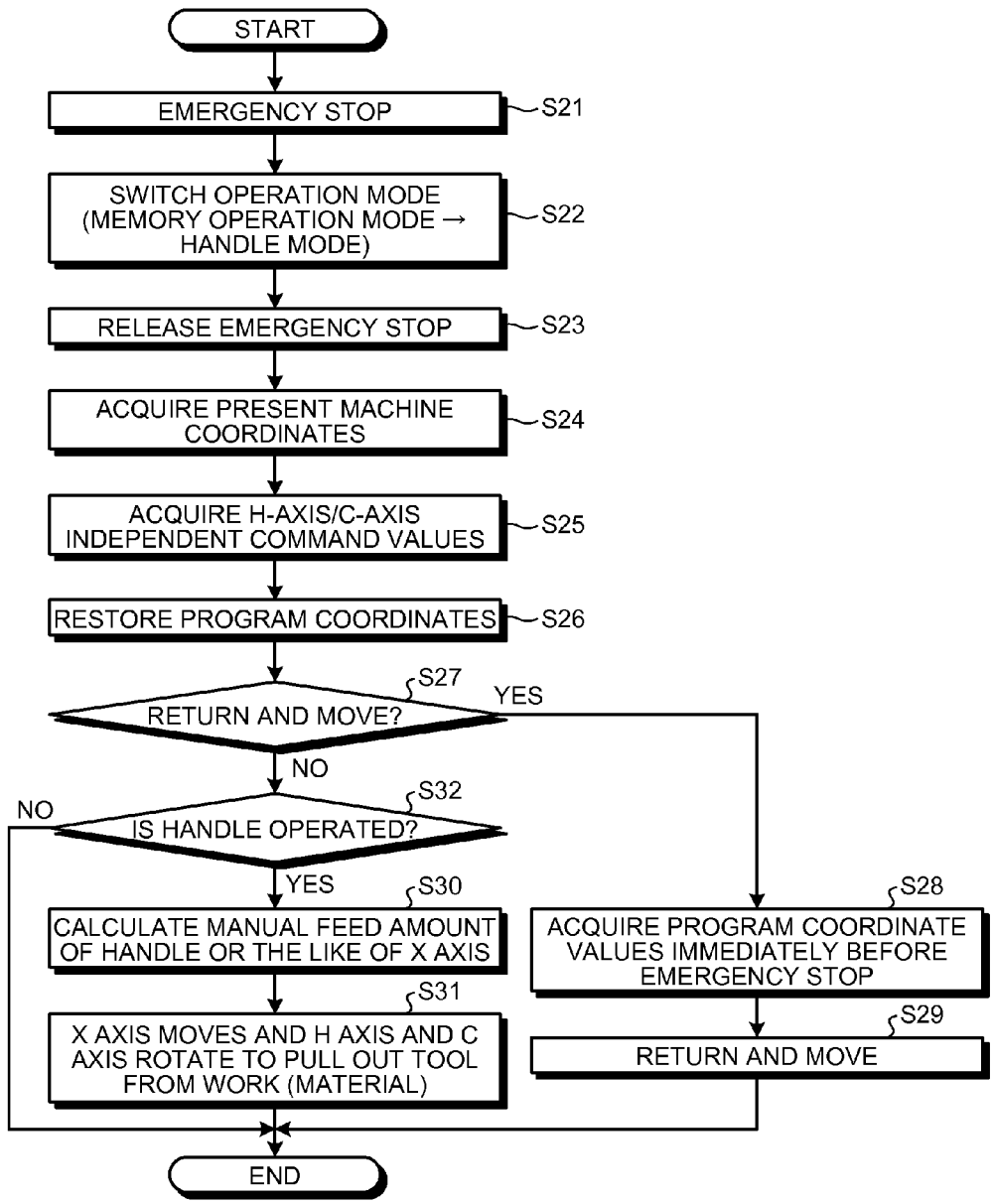
FIG. 4 is a flowchart for explaining operation during an emergency stop of the numerical control apparatus in the first embodiment.
Figure 5:
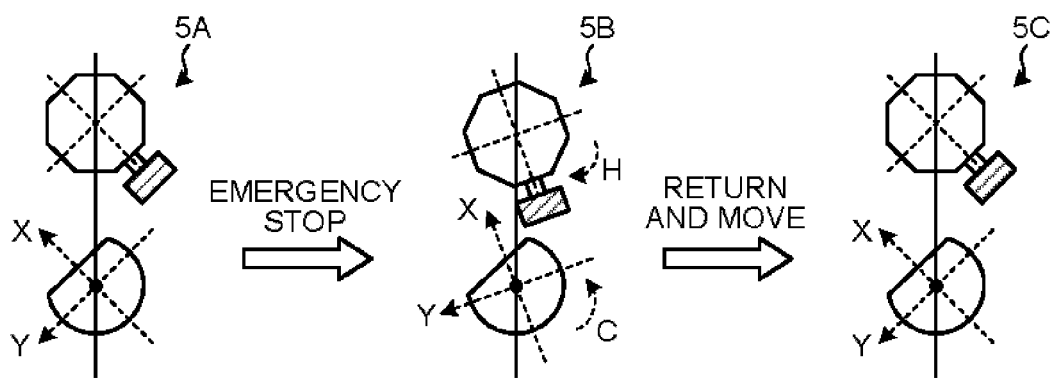
FIG. 5 is a diagram for explaining operation during the emergency stop of the machine tool in the first embodiment.
Figure 6:
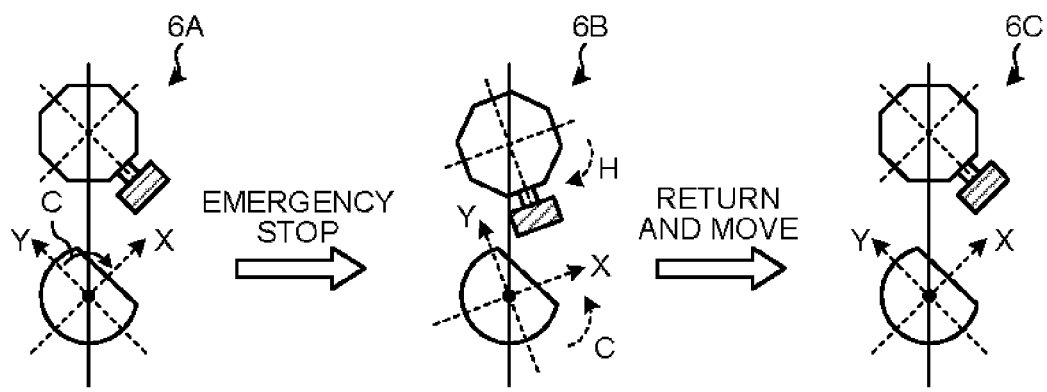
FIG. 6 is a diagram for explaining the operation during the emergency stop of the machine tool in the first embodiment.
Figure 7:
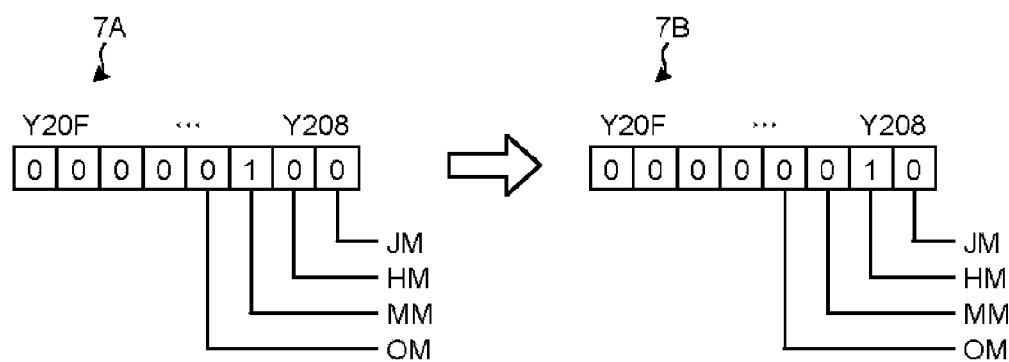
FIG. 7 is a diagram of an operation mode signal in the first embodiment.
Figure 8:
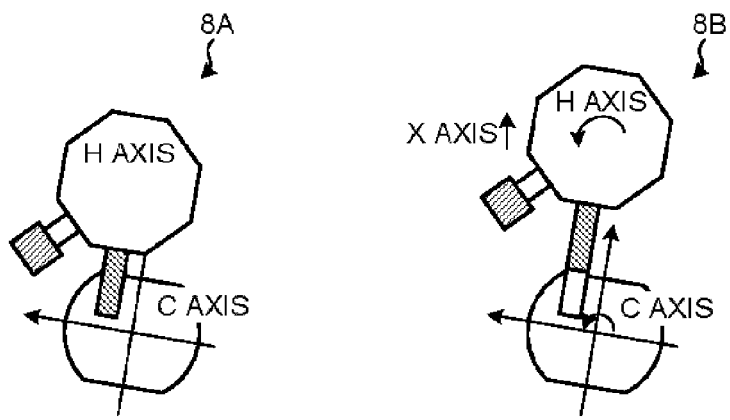
FIG. 8 is a diagram for explaining operation after release of the emergency stop of the machine tool in the first embodiment.

Operation during an emergency stop of the machine tool 900 performed using the numerical control apparatus 1 according to the first embodiment is explained with reference to FIGS. 4 to 8. FIG. 4 is a flowchart for explaining the operation during the emergency stop of the machine tool 900 performed using the numerical control apparatus 1. FIGS. 5, 6, and 8 are diagrams for explaining the operation during the emergency stop of the machine tool 900. FIG. 7 is a diagram of a data structure of an operation mode signal.

At step S21 shown in FIG. 4, when an emergency stop button in the input operation unit 20 is pressed by the user, a command for an emergency stop is input to the units.

When receiving the command for the emergency stop, the driving unit 90 shifts to a servo-off state in which the driving unit 90 does not receive driving control data from the axis-data input/output unit 42. Consequently, for example, the turret 905 and the work supporting section 906 (the work W) move with own weights thereof (see 5A and 5B of FIG. 5 and 6A and 6B of FIG. 6. Alternatively, for example, the tool 9052 for drilling remains inserted into the work W (see 8A of FIG. 8).

At step S22, when operation for switching an operation mode from a memory operation mode to a handle mode is performed by the user, the PLC 36 switches an operation mode signal input to the machine-control-signal processing unit 35 from a state of memory operation mode ON (a state in which a bit MM is "1" shown in 7A of FIG. 7) to a state of handle operation mode ON (a state in which a bit HM is "1" shown in 7B of FIG.7) and causes the shared area 345 to temporarily store the operation mode signal. Consequently, in the numerical control apparatus 1, the units recognize that the operation mode is the handle operation mode by referring to the operation mode signal of the shared area 345 (the state of handle operation mode ON). The imaginary Y-axis control mode signal of the shared area 345 remains in the ON state even after the emergency stop.

At step S23, when the emergency stop button in the input operation unit 20 is released by the user, a command for emergency stop release is input to the units. At this point, the driving unit 90 shifts to a servo-on state.

At step S24, the program-coordinate restoring unit 417 acquires, from the position sensors 95, 96, and 98 of the servomotors 901, 902, and 904 through the axis-data input/output unit 42, the present coordinate positions (Xr0, Hr0, Cr0) of the X axis, the H axis, and the C axis in the machine coordinate system at the time when the emergency stop is released.

At step S25, when an independent rotation amount command for the H axis or the C axis is received before the emergency stop, the program-coordinate restoring unit 417 reads out the H-axis/C-axis independent command memorandum 348 from the storing unit 34b and acquires the present H-axis rotating position and C-axis rotating position (ΔH3, ΔC3) by the independent rotation amount command for the H axis or the C axis.

At step S26, the program-coordinate restoring unit 417 restores the present coordinates of the X axis and the Y axis in the program coordinate system.

That is, when the independent rotation amount command for the H axis or the C axis is not received before the emergency stop, the program-coordinate restoring unit 417 restores, according to Formulas 6 and 7 above, the present coordinates (X0, Y0) of the X axis and the Y axis in the program coordinate system from the present coordinates (Xr0, Hr0, Cr0) of the X axis, the H axis, and the C axis in the machine coordinate system.

Alternatively, when the independent rotation amount command for the H axis or the C axis is received before the emergency stop, the program-coordinate restoring unit 417 calculates coordinates (Xr0, Hr0−ΔH3, Cr0−ΔC3) obtained by subtracting the present H-axis rotating position and C-axis rotating position (ΔH3, ΔC3) from the present coordinates (Xr0, Hr0, Cr0) of the X axis, the H axis, and the C axis in the machine coordinate system and restores the present coordinates (X0', Y0') of the X axis and the Y axis in the program coordinate system according to Formulas 6 and 7 above from the coordinates (Xr0, Hr0−ΔH3, Cr0−ΔC3). In other words, the program-coordinate restoring unit 417 calculates coordinates (X0', Y0', ΔH3, ΔC3) obtained by further reflecting the present H-axis rotating position and C-axis rotating position (ΔH3, ΔC3) by the independent rotation amount command for the H axis or the C axis on the restored coordinates (X0, Y0) of the X axis and the Y axis in the program coordinate system and sets the calculated coordinates as the restored present coordinates (X0', Y0', ΔH3, ΔC3) in the program coordinate system. Further, in other words, the program-coordinate restoring unit 417 separates positions equivalent to movement amounts stored in the storing unit 34b from the acquired present positions of the X axis, the C axis, and the H axis, performs conversion in a direction opposite to the direction of the coordinate conversion by the imaginary-Y-axis-control processing unit 411 using a result of the separation, and restores the present X-axis coordinate position and Y-axis coordinate position (X0', Y0') in the program coordinate system.

At step S27, the user determines whether returning and movement should be performed. When operation for returning and movement is selected by the user and a returning and movement signal is input to the numerical control apparatus 1 from the user via a switch (not shown in the figure), the PLC 36 detects the returning and movement signal. When detecting the returning and movement signal ("Yes" at S27), the PLC 36 advances the processing to step S28. When not detecting the returning and movement signal ("No" at S27), the PLC 36 advances the processing to step S32.

At step S28, the imaginary-Y-axis-control returning and moving unit 418 reads out the emergency-stop-time program coordinate memorandum 346 from the storing unit 34a and acquires the coordinates (X4, Y4) of the X axis and the Y axis immediately before the emergency stop in the program coordinate system.

At step S29, the imaginary-Y-axis-control returning and moving unit 418 coordinate-converts the X-Y target positions (X4, Y4) according to Formulas 1 to 3 above and calculates the moving positions (Xr4, Hr4, Cr4) in the machine coordinate system. Further, the imaginary-Y-axis-control returning and moving unit 418 calculates the present positions (Xr0, Hr0, Cr0) coordinate-converted from (X0, Y0) in the same manner and the moving positions (Xr4, Hr4, Cr4) of this time to thereby calculate the X-axis movement amount (ΔXr4=Xr4−Xr0), the H-axis rotation amount (ΔHr4=Hr4−Hr0), and the C-axis rotation amount (ΔCr4=Cr4−Cr0) in the machine coordinate system. The imaginary-Y-axis-control returning and moving unit 418 supplies the movement amount command (ΔXr4) for the X axis, the rotation amount command (ΔHr4) for the H axis, and the rotation amount command (ΔCr4) for the C axis to the axis-data input/output unit 42.

Consequently, the imaginary-Y-axis-control returning and moving unit 418 performs movement of the X axis, rotation of the H axis, and rotation of the C axis in the machine coordinate system in synchronization with one another to move the turret 905 and the work W from the restored present coordinates (X0, Y0) of the X axis and the Y axis to the coordinates (X4, Y4) of the X axis and the Y axis stored in the storing unit 34a in the program coordinate system and returns and moves the turret 905 and the work W to positions immediately before the emergency stop (see 5C of FIG. 5 and 6C of FIG. 6).

At step S32, the imaginary-Y-axis control unit 41 determines whether operation of the handle 50 by the user is performed. The user rotates the handle 50 to move the tool inserted into the work W in the X-axis direction on the program coordinate and pulls out the tool from the work W. At this point, the handle 50 generates a manual feed command (a movement amount command for the X axis) and supplies the manual feed command to the imaginary-Y-axis control unit 41 through the interpolation processing unit 38 and the acceleration/deceleration processing unit 43. When receiving the manual feed command during the handle mode, the imaginary-Y-axis-control processing unit 411 of the imaginary-Y-axis control unit 41 determines that the operation of the handle 50 by the user is performed and advances the processing to step S30. When not receiving the manual feed command within a predetermined time after the shift to the handle mode, the imaginary-Y-axis-control processing unit 411 of the imaginary-Y-axis control unit 41 determines that the operation of the handle 50 by the user is not performed and ends the processing.

At step S30, the imaginary-Y-axis-control processing unit 411 calculates a manual feed amount (a movement amount command for the X axis) in the program coordinate system based on the manual feed command. That is, the imaginary-Y-axis-control processing unit 411 calculates a moving position of this time (X5) for moving the tool according to the manual feed amount (the movement amount command for the X axis) from the position restored by the program-coordinate restoring unit 417 in the program coordinate system. The imaginary-Y-axis-control processing unit 411 coordinate-converts the moving position of this time (X5) in the program coordinate system according to Formulas 1 to 3 above and calculates moving positions (Xr5, Hr5, Cr5) in the machine coordinate system. When the manual feed amount is a manual feed amount of the Y axis, moving positions can be calculated by coordinate conversion in the same manner.

At step S31, the imaginary-Y-axis-control processing unit 411 calculates a difference between the present moving positions (Xr0, Hr0, Cr0) and the moving positions (Xr5, Hr5, Cr5) in the machine coordinate system to thereby calculate an X-axis movement amount (ΔXr5=Xr5−Xr0), an H-axis rotation amount (ΔHr5=Hr5−Hr0), and a C-axis rotation amount (ΔCr5=Cr5−Cr0) in the machine coordinate system. That is, the imaginary-Y-axis-control processing unit 411 sets the manual feed command generated by the handle 50 as a movement amount command for the X axis in the program coordinate system and generates a movement amount command for the X axis (the X-axis movement amount ΔXr5), a rotation amount command for the H axis (the H-axis rotation amount ΔHr5), and a rotation amount command for the C axis (the C-axis rotation amount ΔCr5) in the machine coordinate system from the movement amount command for the X axis in the program coordinate system. The imaginary-Y-axis-control processing unit 411 supplies the movement amount command (ΔXr5) of the X axis to the axis-data input/output unit 42 and supplies the rotation amount command (ΔHr5) for the H axis and the rotation amount command (ΔCr5) for the C axis to the axis-data input/output unit 42 through the imaginary-Y-axis-control-command combining unit 412.

Consequently, the imaginary-Y-axis-control processing unit 411 drives the X axis, the H axis, and the C axis in association with one another based on the present X-axis coordinate position and Y-axis coordinate position in the program coordinate system restored by the program-coordinate restoring unit 417 and the movement command for the X axis generated from the handle 50 such that the tool is pulled out from the present X-axis coordinate position and Y-axis coordinate position without interfering with the work W. That is, the imaginary-Y-axis-control processing unit 411 performs movement of the X axis, rotation of the H axis, and rotation of the C axis in the machine coordinate system in synchronization with one another and pulls the tool from the work W (see 8B of FIG. 8).

In the above explanation, an example in which the imaginary-Y-axis-control returning and moving unit 418 performs the returning and movement processing (steps S28 and S29) in the handle mode is explained. However, the imaginary-Y-axis-control returning and moving unit 418 can perform the returning and movement processing (steps S28 and S29) in the memory operation mode. In that case, for example, operation for switching the operation mode from the handle mode to the memory operation mode can be performed by the user at step S28.

Figure 13:
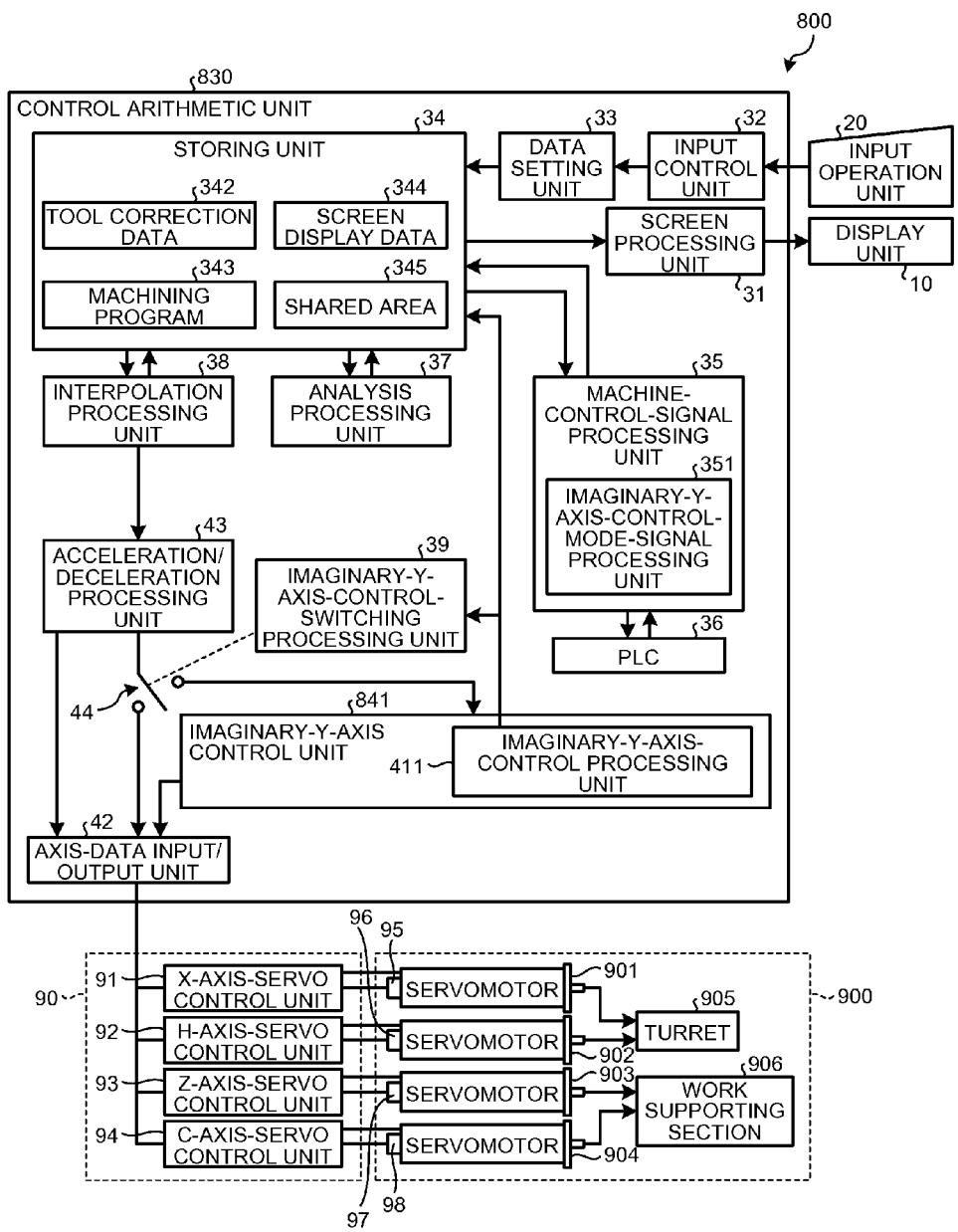
FIG. 13 is a diagram of the configuration of a numerical control apparatus according to a comparative example.
Figure 15:
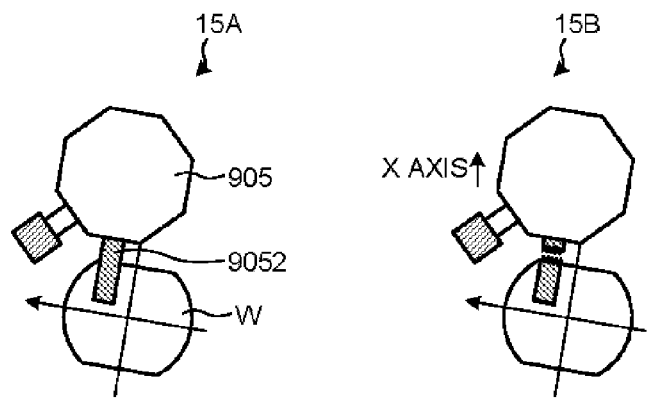
FIG. 15 is a diagram for explaining the operation during the emergency stop of the machine tool in the comparative example.

It is assumed that, as shown in FIG. 13, in a control arithmetic unit 830 of a numerical control apparatus 800, an imaginary-Y-axis control unit 841 does not include the program-coordinate restoring unit 417 (see FIG. 2). In this case, when the machine tool 900 is emergency-stopped while the machine tool 900 is machining the work W with the tool 9052, imaginary Y-axis control is cancelled. Thereafter, even if the emergency stop of the machine tool 900 is released, as shown in 15A of FIG. 15, when the tool 9052 is inserted into the work W, because the imaginary Y-axis control is cancelled, it is difficult to rotate, while moving the tool 9052 in the X-axis direction, the turret 905 and the work W in association with the movement of the tool 9052. That is, it is difficult to pull out the tool 9052 from the work W to return the machine tool 900 to a state before the emergency stop. It is likely that the tool 9052 is broken as shown in 15B of FIG. 15 if it is attempted to pull out the tool 9052 from the work W by force.

On the other hand, in the first embodiment, when the emergency stop is released, the program-coordinate restoring unit 417 restores the coordinates (X0, Y0) of the X axis and the Y axis in the program coordinate system from the coordinates of the X axis, the H axis, and the C axis in the machine coordinate system. The imaginary-Y-axis-control processing unit 411 performs movement of the X axis, rotation of the H axis, and rotation of the C axis in the machine coordinate system in synchronization with one another to move the turret 905 and the work W from the coordinate (X0, Y0) of the X axis and the Y axis restored by the program-coordinate restoring unit 417 in the program coordinate system according to the manual feed command (the movement amount command for the X axis) received by the handle 50. Consequently, the imaginary-Y-axis-control processing unit 411 pulls the tool from the work W. That is, the imaginary-Y-axis-control processing unit 411 pulls out the tool from the work W. That is, it is easy to pull out the tool 9052 from the work W. The tool 9052 is less easily broken. Therefore, even when the machine tool 900 is emergency-stopped in a state in which the tool 9052 is inserted into the work W during the imaginary Y-axis control, it is possible to pull out the tool 9052 from the work W and return the machine tool 900 to the state before the emergency stop.

Figure 14:
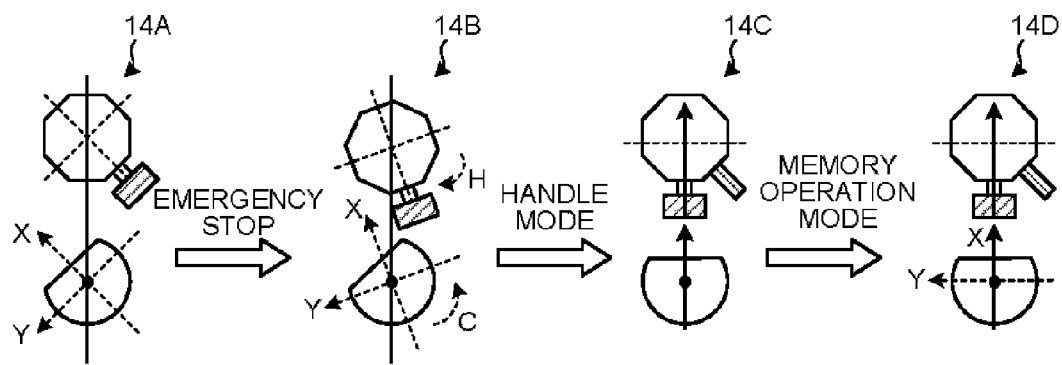
FIG. 14 is a diagram for explaining operation during an emergency stop of a machine tool in the comparative example.

When the imaginary-Y-axis control unit 841 does not include the program-coordinate restoring unit 417 as shown in FIG. 13, even when the tool 9051 is not inserted into the work W as shown in 14A of FIG. 14, when the machine tool 900 is emergency-stopped, the imaginary Y-axis control is cancelled and the driving of the turret 905 and the work W shifts to the servo-off state. Therefore, as shown in 14B of FIG. 14, the turret 905 and the work W move with own weights thereof. Consequently, it is difficult to grasp the present coordinates of the X axis and the Y axis of the machine tool 900 in the program coordinate system and it is also difficult to grasp coordinate positions immediately before the emergency stop of the machine tool 900. Therefore, it is impossible to instruct the numerical control apparatus 800 to return the machine tool 900 to the state before the emergency stop on the program coordinate system. Therefore, as shown in 14C of FIG. 14, the operation mode is shifted to the handle mode and the turret 905 and the work W are returned to reference positions of the machine coordinate system (different from positions before the emergency stop). As shown in 14B of FIG. 14, the operation mode is returned to the memory operation mode. That is, it is difficult to return the turret 905 in the machine tool 900 and the work W to the positions immediately before the emergency stop to return the machine tool 900 to a state before the emergency stop.

On the other hand, in the first embodiment, the imaginary-Y-axis control unit 41 includes the program-coordinate restoring unit 417. When the emergency stop is released, the program-coordinate restoring unit 417 restores the present coordinates (X0, Y0) of the X axis and the Y axis in the program coordinate system from the present coordinates of the X axis, the H axis, and the C axis in the machine coordinate system. Consequently, because the present coordinate positions of the X axis and the Y axis in the program coordinate system can be grasped, it is possible to instruct the numerical control apparatus 1 to return the machine tool 900 to the state before the emergency stop on the program coordinate system. Therefore, it is possible to return the machine tool 900 to the state before the emergency stop even when the machine tool 900 is emergency-stopped in a state in which the tool 9051 is not inserted into the work W during the imaginary Y-axis control.

In particular, when receiving a command for emergency stop release, the imaginary-Y-axis-control returning and moving unit 418 reads out the emergency-stop-time program coordinate memorandum 346 from the storing unit 34a and acquires the coordinates (X4, Y4) of the X axis and the Y axis immediately before the emergency stop in the program coordinate system. The imaginary-Y-axis-control returning and moving unit 418 performs movement of the X axis, rotation of the H axis, and rotation of the C axis in the machine coordinate system in synchronization with one another to move the turret 905 and the work W from the restored present coordinates (X0, Y0) of the X axis and the Y axis to the coordinates (X4, Y4) of the X axis and the Y axis stored in the storing unit 34a in the program coordinate system and returns and moves the turret 905 and the work W to positions immediately before the emergency stop. Therefore, it is possible to return the machine tool 900 to the state before the emergency stop.

In the first embodiment, when an independent rotation amount command for the H axis or the C axis is received before the emergency stop, the program-coordinate restoring unit 417 reads out the H-axis/C-axis independent command memorandum 348 from the storing unit 34b and acquires the present H-axis rotating position and C-axis rotating position (ΔH3, ΔC3) by the independent rotation amount command for the H axis or the C axis. The program-coordinate restoring unit 417 calculates the coordinates (X0', Y0', ΔH3, ΔC3) obtained by reflecting the present H-axis rotating position and C-axis rotating position (ΔH3, ΔC3) by the independent rotation amount command for the H axis or the C axis on the restored coordinates (X0, Y0) of the X axis and the Y axis in the program coordinate system and sets the calculated coordinates as the restored present coordinates (X0', Y0', ΔH3, ΔC3) in the program coordinate system. Therefore, even when the independent rotation amount command for the H axis and the C axis is performed during the imaginary Y-axis control before the machine tool 900 is emergency-stopped, the present coordinates in the program coordinate system can be restored. Therefore, it is possible to instruct the numerical control apparatus 1 to return the machine tool 900 to the state before the emergency stop on the program coordinate system.

Second Embodiment.

A numerical control apparatus 1i according to a second embodiment is explained. In the following explanation, differences from the first embodiment are mainly explained.

The numerical control apparatus 1i according to the second embodiment is different from the first embodiment in that a destination of returning and movement by returning and movement processing is a coordinate position described in an X-Y axes movement command included in a machining program, which is an X-Y axes movement command already executed at a shortest point of time from a point of time of an emergency stop. The coordinate position described in the X-Y axes movement command already executed at the shortest point of time from the point of time of an emergency stop is, for example, when the X-Y axes movement command is included in description of the preceding block on the machining program, an end position of the preceding block of an executed block during the emergency stop. For example, when the X-Y axes movement command is not included in the preceding block and is included in the second preceding block on the machining program, the coordinate position is an end position of the second preceding block of the executed block during the emergency stop. In the following illustrative explanation, the destination of the returning and movement by the returning and movement processing is the end position of the preceding block of the executed block during the emergency stop.

Figure 9:
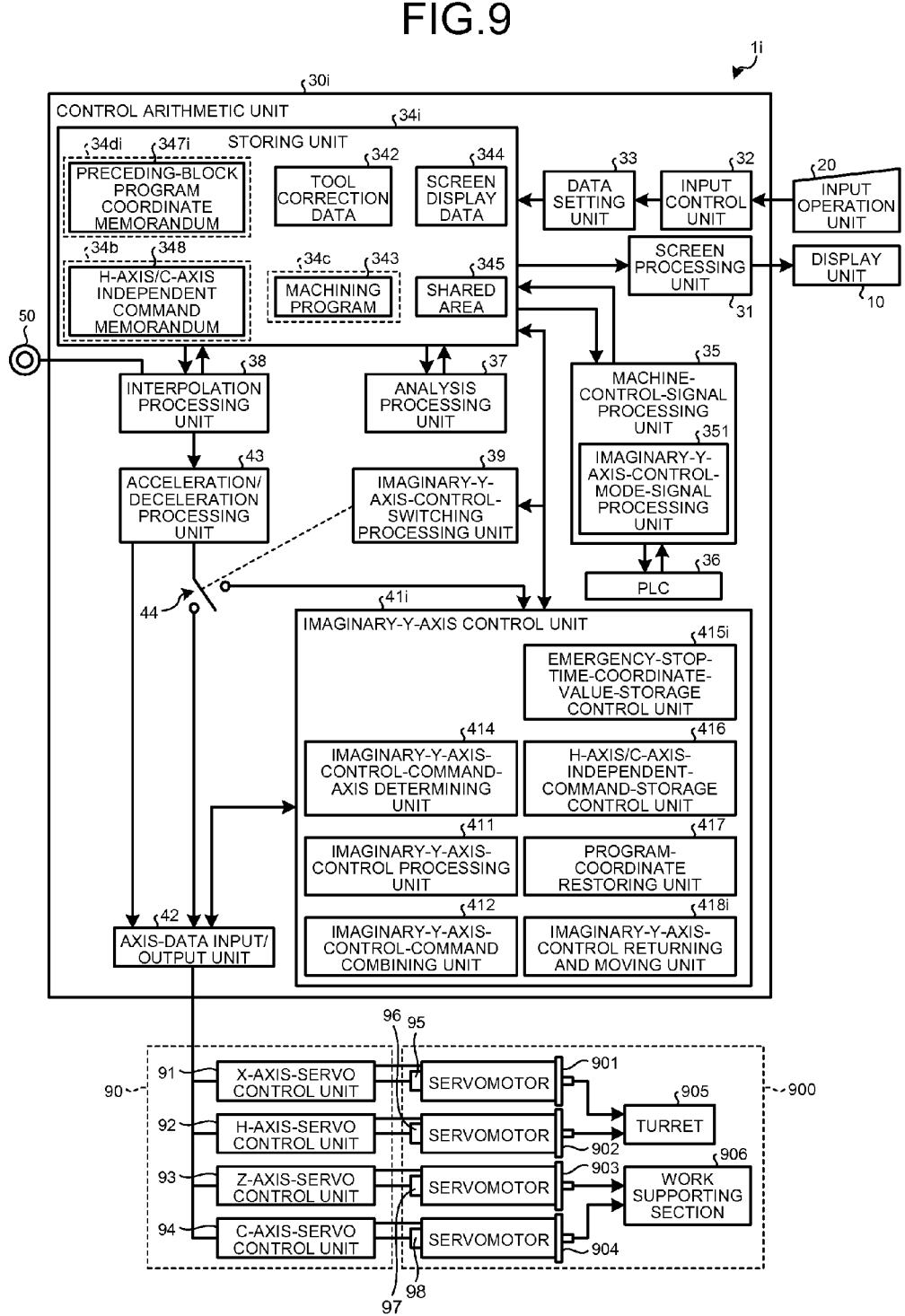
FIG. 9 is a diagram of the configuration of a numerical control apparatus according to a second embodiment.

Specifically, the numerical control apparatus 1i is different from the first embodiment in that the numerical control apparatus 1i includes a control arithmetic unit 30i as shown in FIG. 9. FIG. 9 is a block diagram of the configuration of the numerical control apparatus 1i according to the second embodiment. The control arithmetic unit 30i includes a storing unit 34i and an imaginary-Y-axis control unit 41i.

The storing unit 34i includes a storing unit 34di instead of the storing unit 34a (see FIG. 2). The storing unit 34di stores a preceding-block program coordinate memorandum 347i.

The imaginary-Y-axis control unit 41i includes an emergency-stop-time-coordinate-value-storage control unit 415i and an imaginary-Y-axis-control returning and moving unit 418i.

The emergency-stop-time-coordinate-value-storage control unit 415i controls storage of the preceding-block program coordinate memorandum 347i in the storing unit 34di.

For example, the emergency-stop-time-coordinate-value-storage control unit 415i regularly acquires, from the imaginary-Y-axis-control processing unit 411, coordinates (X6, Y6) of the X axis and the Y axis of an end position of a block in the program coordinate system. The emergency-stop-time-coordinate-value-storage control unit 415i, for example, regularly overwrites and stores the acquired coordinates (X6, Y6) in the storing unit 34di as the preceding-block program coordinate memorandum 347i.

When receiving a command for emergency stop release, the imaginary-Y-axis-control returning and moving unit 418i reads out the preceding-block program coordinate memorandum 347i from the storing unit 34di and acquires the coordinates (X6, Y6) of the X axis and the Y axis in the end position of the preceding block executed during the emergency stop in the program coordinate system. The imaginary-Y-axis-control returning and moving unit 418i performs movement of the X axis, rotation of the H axis, and rotation of the C axis in the machine coordinate system in synchronization with one another to move the turret 905 and the work W from the present coordinates (X0, Y0) of the X axis and the Y axis restored by the program-coordinate restoring unit 417 to the coordinates (X6, Y6) of the X axis and the Y axis stored in the storing unit 34di. Consequently, the imaginary-Y-axis-control returning and moving unit 418i returns and moves the work W and the turret 905 to the end position of the preceding block of the block executed during the emergency stop in the program coordinate system.

Figure 10:
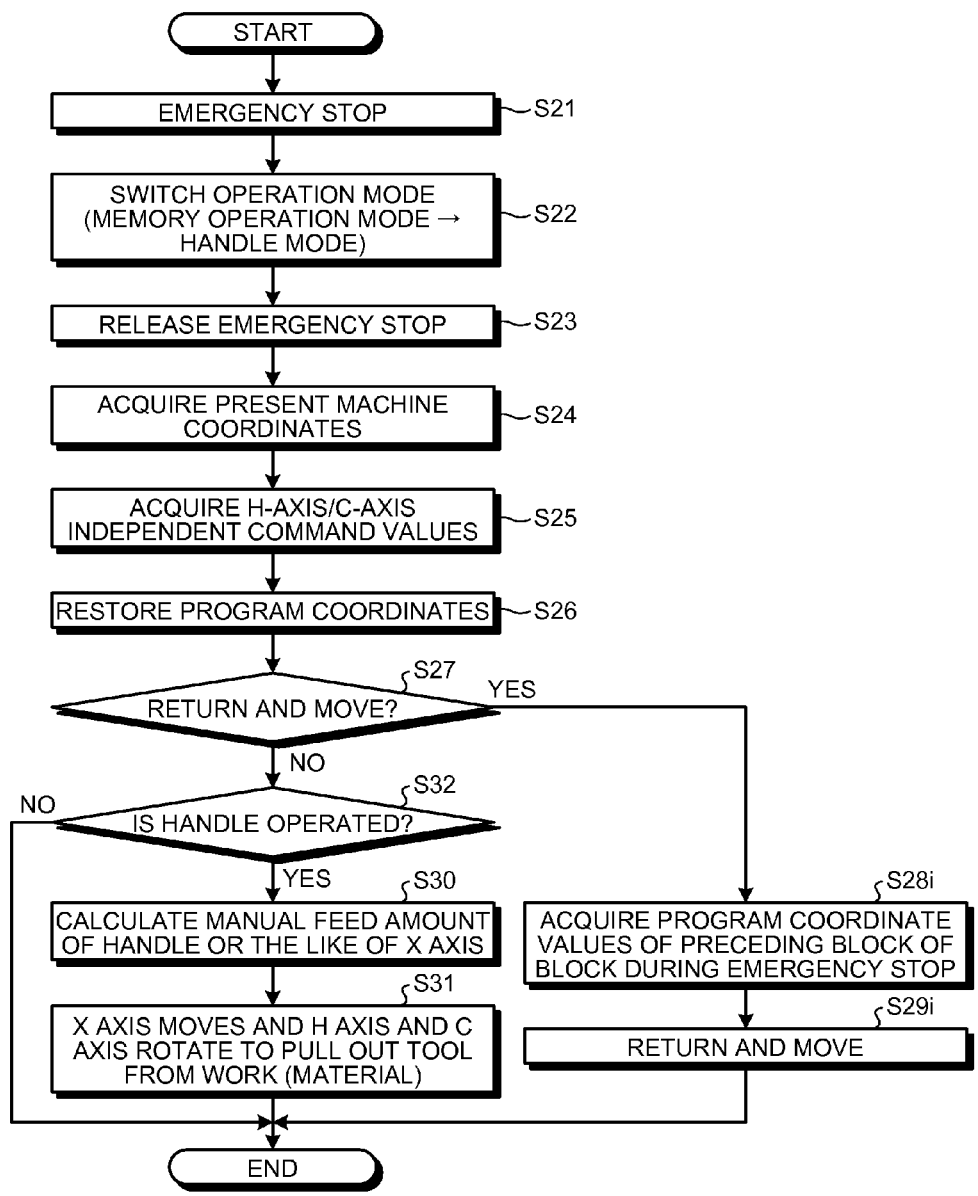
FIG. 10 is a flowchart for explaining operation during an emergency stop of the numerical control in the second embodiment.

Operation during the emergency stop of the machine tool 900 performed using the numerical control apparatus 1i is different from the first embodiment in points explained below as shown in FIGS. 10 to 12. FIG. 10 is a flowchart for explaining the operation during the emergency stop of the machine tool 900 performed using the numerical control apparatus 1i according to the second embodiment. FIG. 11 is a diagram for explaining the operation during the emergency stop of the machine tool 900. FIG. 12 is a diagram of described content in the machining program 343 stored in the storing unit 34i of the numerical control apparatus 1i according to the second embodiment.

At step S21, when receiving a command for an emergency stop, the driving unit 90 shifts to a servo-off state in which the driving unit 90 does not receive driving control data from the axis-data input/output unit 42. Consequently, for example, the turret 905 and the work supporting section 906 (the work W) move with own weights thereof (see 11B and 11C of FIG. 11).

At step S28i, the imaginary-Y-axis-control returning and moving unit 418i reads out the preceding-block program coordinate memorandum 347i from the storing unit 34di and acquires the coordinates (X6, Y6) of the X axis and the Y axis of the end position of the preceding block of the block executed immediately before the emergency stop in the program coordinate system.

For example, it is assumed that a block executed during the emergency stop at step S21 corresponds to "N107 G01 X20 Y-50, F1000" ("milling") in the machining program 343 shown in FIG. 12 (see 11B of FIG. 11). In this case, the preceding block of the block executed during the emergency stop corresponds to "N106 G00 X20 Y50" ("move to a machining start position") in the machining program 343. At this point, the end position of the preceding block of the executed block is "X20 Y50" in the program coordinate system (see 11A of FIG. 11). That is, the preceding-block program coordinate memorandum 347i includes "X20 Y50" in the program coordinate system as an end position.

The imaginary-Y-axis-control returning and moving unit 418i applies interpolation processing and acceleration/deceleration processing to a movement amount command for moving the turret 905 and the work W from the restored present coordinates (X0, Y0) in the program coordinate system to the coordinates (X6, Y6) of the X axis and the Y axis of the end position of the preceding block of the executed block during the emergency stop.

At step S29i, the imaginary-Y-axis-control returning and moving unit 418i calculates X-Y moving positions of this time using a movement amount command for the X-Y axes, which is as a result of the interpolation processing and the acceleration/deceleration processing, and the restored present coordinates (X0, Y0). The imaginary-Y-axis-control returning and moving unit 418i coordinate-converts the X-Y coordinate positions (X6, Y6) according to Formulas 1 to 3 above and calculates moving positions (Xr6, Hr6, Cr6) in the machine control system. Further, the imaginary-Y-axis-control returning and moving unit 418i calculates a difference between the present positions (Xr0, Hr0, Cr0) coordinate-converted from (X0, Y0) and the moving positions of this time (Xr6, Hr6, Cr6) to thereby calculate an X-axis movement amount ($\Delta$Xr6=Xr6−Xr0), an H-axis rotation amount ($\Delta$Hr6=Hr6−Hr0), and a C-axis rotation amount ($\Delta$Cr6=Cr6−Cr0) in the machine coordinate system. The imaginary-Y-axis-control returning and moving unit 418i supplies a movement amount command ($\Delta$Xr6), a rotation amount command ($\Delta$Hr6) for the H axis, and a rotation amount command ($\Delta$Cr6) for the C axis to the axis-data input/output unit 42.

Consequently, the imaginary-Y-axis-control returning and moving unit 418i performs movement of the X axis, rotation of the H axis, and rotation of the C axis in the machine coordinate system in synchronization with one another to move the turret 905 and the work W from the present coordinates (X0, Y0) of the X axis and the Y axis restored by the program-coordinate restoring unit 417 to the coordinates (X6, Y6) of the X axis and the Y axis stored in the storing unit 34di in the program coordinate system and returns and moves the turret 905 and the work W to the end position of the preceding block of the block executed immediately before the emergency stop (see 11C and 11D of FIG. 11).

Thereafter, the numerical control apparatus 1i can search for the block executed during the emergency stop using a program resumption search function according to an instruction from the user input via the input operation unit 20 and start up (cycle start) to resume (continue) the machining.

As explained above, in the second embodiment, when receiving the command for emergency stop release, the imaginary-Y-axis-control returning and moving unit 418i reads out the preceding-block program coordinate memorandum 347i from the storing unit 34di and acquires the coordinates (X6, Y6) of the X axis and the Y axis in the end position of the preceding block executed during the emergency stop in the program coordinate system. The imaginary-Y-axis-control returning and moving unit 418i performs movement of the X axis, rotation of the H axis, and rotation of the C axis in the machine coordinate system in synchronization with one another to move the turret 905 and the work W from the present coordinates (X0, Y0) of the X axis and the Y axis restored by the program-coordinate restoring unit 417 to the coordinates (X6, Y6) of the X axis and the Y axis stored in the storing unit 34di in the program coordinate system. Consequently, the imaginary-Y-axis-control returning and moving unit 418i returns and moves the work W and the turret 905 to the end position of the preceding block of the block executed during the emergency stop. Therefore, even when the machining tool 900 is emergency-stopped during the imaginary Y-axis control, it is possible to resume machining executed during the emergency stop of the machine tool 900 after the emergency stop of the machine tool 900 is released.

INDUSTRIAL APPLICABILITY

As explained above, the numerical control apparatus according to the present invention is suitable for machining of a work by the imaginary Y-axis control.

REFERENCE SIGNS LIST

1, 1i numerical control apparatuses
10 display unit
20 input operation unit
30, 30i control arithmetic units
31 screen processing unit
32 input control unit
33 data setting unit
34, 34i storing units
34a storing unit
34b storing unit
34c storing unit
34di storing unit
35 machine-control-signal processing unit
36 PLC
37 analysis processing unit
38 interpolation processing unit
39 imaginary-Y-axis-control-switching processing unit
41, 41i imaginary-Y-axis control units
42 axis-data input/output unit
43 acceleration/deceleration processing unit
44 switch
50 handle
90 driving unit
91 X-axis-servo control unit
92 H-axis-servo control unit
93 Z-axis-servo control unit
94 C-axis-servo control unit
95 position sensor
96 position sensor
97 position sensor
98 position sensor
342 tool correction data
343 machining program
344 screen display data
345 shared area
351 imaginary-Y-axis-control-mode-signal processing unit
411 imaginary-Y-axis-control processing unit
412 imaginary-Y-axis-control-command combining unit
414 imaginary-Y-axis-control-command-axis determining unit
415, 415i emergency-stop-time-coordinate-value-storage control units
416 H-axis/C-axis-independent-command-storage control unit
417 program-coordinate restoring unit
418, 418i imaginary-Y-axis-control returning and moving units
800 numerical-value control apparatus
830 control arithmetic unit
841 imaginary-Y-axis control unit
900 machine tool
901 servomotor
902 servomotor
903 servomotor
904 servomotor
905 turret
906 work supporting unit
9051 tool
9052 tool
W work

The invention claimed is:

1. A numerical control apparatus that controls a machine tool including an X axis for moving a turret to which a plurality of tools are attached, an H axis for rotating the turret, and a C axis for rotating a work and not including a Y axis orthogonal to the X axis, the numerical control apparatus comprising:
an imaginary-Y-axis control unit configured to execute an imaginary Y-axis control mode, the imaginary Y-axis control mode being a mode for converting an X-Y axes movement command in a machining program described in a program coordinate system into a command in a machine coordinate system including X-H-C axes and for driving the X axis, the H axis, and the C axis in association with one another according to the converted command;
an acquiring unit configured to acquire, when an emergency stop occurs during the imaginary Y-axis control mode, present positions of the X axis, the C axis, and the H axis at time when the emergency stop is released; and
a restoring unit configured to restore a present X-axis coordinate position and a present Y-axis coordinate position in the program coordinate system from the acquired present positions of the X axis, the C axis, and the H axis, wherein;
the imaginary-Y-axis control unit includes:
a separating unit configured to separate, for each block, a command of the machining program created in the program coordinate system into a first movement command and a second movement command, the first movement command including at least one of an X-axis movement command and a Y-axis movement command, the second movement command including at least one of an H-axis independent movement command and a C-axis independent movement command;
a coordinate converting unit configured to convert the first movement command into a command of the machine coordinate system including the X-H-C axes;
a combining unit configured to combine the converted H-axis movement command and the separated H-axis independent movement command and combine the converted C-axis movement command and the separated C-axis independent movement command; and
a driving unit configured to control to drive the X axis, the H axis, and the C axis according to the converted X-axis movement command and the combined H-axis movement command and C-axis movement command,
the numerical control apparatus further comprises a first storing unit configured to store a movement amount by the second movement command before the emergency stop, and
the restoring unit separates a position equivalent to a movement amount stored in the first storing unit from the acquired present positions of the X axis, the C axis, and the H axis, performs conversion in a direction opposite to a direction of the coordinate conversion by the coordinate converting unit using a result of the separation, and restores the present X-axis coordinate position and the present Y-axis coordinate position in the program coordinate system.

2. The numerical control apparatus according to claim 1, further comprising:
- a second storing unit configured to store coordinate positions of the X axis and the Y axis in the program coordinate system immediately before the emergency stop; and
- a returning and moving unit configured to drive the X axis, the H axis, and the C axis in association with one another to return and move the turret and the work from the present X-axis coordinate position and the present Y-axis coordinate position in the program coordinate system restored by the restoring unit to the coordinate positions stored in the second storing unit.

3. The numerical control apparatus according to claim 1, further comprising:
- a third storing unit configured to store coordinate positions described in an X-Y axes movement command included in the machining program, which is an X-Y axes movement command already executed at a shortest point of time from a point of time of the emergency stop; and
- a returning and moving unit configured to drive the X axis, the H axis, and the C axis in association with one another to return and move the turret and the work from the present X-axis coordinate position and the present Y-axis coordinate position in the program coordinate system restored by the restoring unit to the coordinate positions stored in the third storing unit.

* * * * *